United States Patent
Shirasaka et al.

(10) Patent No.: US 6,600,003 B2
(45) Date of Patent: Jul. 29, 2003

(54) RUBBER MEMBER FOR USE IN ELECTROPHOTOGRAPHIC APPARATUS AND RUBBER MEMBER FOR SEPARATING PAPER SHEETS

(75) Inventors: Hitoshi Shirasaka, Yokohama (JP); Noriko Abe, Yokohama (JP); Kouichi Shizuru, Yokohama (JP); Katsuji Shimabukuro, Tokyo (JP); Mika Sakatani, Yokohama (JP); Shuhei Noda, Yokohama (JP)

(73) Assignee: Hokushin Corporation, Kanagawa (JP)

( * ) Notice: Subject to any disclaimer, the term of this patent is extended or adjusted under 35 U.S.C. 154(b) by 0 days.

(21) Appl. No.: 09/922,613

(22) Filed: Aug. 6, 2001

(65) Prior Publication Data
US 2002/0037990 A1 Mar. 28, 2002

(30) Foreign Application Priority Data

Aug. 11, 2000 (JP) ....................... 2000-245261
Jan. 11, 2001 (JP) ....................... 2001-004276
May 25, 2001 (JP) ....................... 2001-156786
Jun. 21, 2001 (JP) ....................... 2001-187868

(51) Int. Cl.$^7$ .............................................. C08G 18/42
(52) U.S. Cl. .................................... 528/80; 528/83
(58) Field of Search ..................................... 528/80, 83

(56) References Cited

U.S. PATENT DOCUMENTS 4,085,092 A * 4/1978 Chang et al.
4,559,366 A * 12/1985 Hostettler
4,639,471 A * 1/1987 Hirai et al.
5,606,005 A * 2/1997 Oshita et al.

FOREIGN PATENT DOCUMENTS

| JP | 62145274 | 6/1987 |
| JP | 638685 | 1/1988 |
| JP | 2284191 | 11/1990 |
| JP | 5278045 | 10/1993 |

* cited by examiner

Primary Examiner—Rachel Gorr
(74) Attorney, Agent, or Firm—Huntley & Associates, LLC

(57) ABSTRACT

The present invention provides an electrophotography rubber member which has a rebound resilience remaining satisfactorily stabilized over changes in environmental conditions and can serve as a member such as a high-performance cleaning blade and provides a similar sheet-separation rubber member which generates no noise. The electrophotography rubber member or sheet-separation rubber member is formed of a rubber elastomer containing a polyurethane formed from a long-chain polyol containing a polyester-polyol having a number average molecular weight of 500–5,000 and an ester concentration of 2–8 mmol/g, wherein the ester concentration is defined by the following relationship: Ester concentration (mmol/g)=(Amount by mol of ester groups)/(Weight of the polyester-polyol).

21 Claims, 4 Drawing Sheets

RUBBER MEMBER FOR USE IN ELECTROPHOTOGRAPHIC APPARATUS AND RUBBER MEMBER FOR SEPARATING PAPER SHEETS

BACKGROUND OF THE INVENTION

1. Field of the Invention

The present invention relates to a rubber member for use in an electrophotographic apparatus (hereinafter referred to as an electrophotography rubber member) as a part such as a cleaning part, a charge-imparting part, a development part, an image-transfer part, or a paper-feed part, and more particularly to an electrophotography rubber member employed as a member such as a cleaning member for removing toner from a toner-image carrier (e.g., a photoreceptor or an image-transfer belt) which is provided with a toner image and subsequently transfers the toner image to an image-transfer member; a development member for use in a development part; or a charge-imparting member which imparts electric charge to a photoreceptor. The present invention also relates to a rubber member for separating paper sheets (hereinafter referred to as a sheet-separation rubber member), which member is to be used in a paper-feed apparatus employed in a variety of printers such as ink-jet printers and laser printers and in a variety of apparatuses for office automation (OA) such as facsimile machines.

2. Background Art

In a typical electrophotographic process, an electrophotographic photoreceptor undergoes at least the steps of charging, light-exposure, development, image-transfer, and cleaning. In such an electrophotographic process, polyurethane is employed as a member such as a cleaning member for removing toner from a toner-image carrier which is provided with a toner image and subsequently transfers the toner image to an image-transfer member; a development member for use in a development part; or a charge-imparting member which imparts electric charge to a photoreceptor.

The reason for use of polyurethane is that polyurethane exhibits excellent wear resistance and sufficient mechanical strength even though no additive such as a reinforcing agent is added. In other words, polyurethane is a material which does not stain an object to be processed.

However, polyurethane is known to have temperature-dependent physical properties. Among them, rebound resilience is particularly temperature-dependent, and the dependence poses a problem during a cleaning step carried out by use of a cleaning blade formed of polyurethane. Specifically, relatively low resilience at low temperature results in poor cleaning performance, and relatively high resilience at high temperature causes problematic chipping of an edge of the cleaning blade and generates problematic noise.

Recently, keeping pace with a trend of providing high-quality images in electrophotography, the particle size of toner has been reduced. Thus, provision of a cleaning blade of higher performance is desired.

In order to clearly illustrate the problems, a typical paper-feed part employed in a variety of OA machines will be described. As shown in FIG. 1, a conveyor part for conveying paper sheets 11 is provided. On the downstream side with respect to a conveyance direction are provided a feed roller 12 to be rotated by means of driving means and a sheet-separation rubber member 10 formed of a material such as urethane rubber, the rubber member 10 oppositely facing and being in pressure contact with the feed roller 12.

In the paper-feed part, a paper sheet 11 is fed, by means of the conveyor part, into a space between the feed roller 12 and the sheet-separation rubber member 10, and is further conveyed through rotation of the feed roller 12. When a plurality of sheets 11 are fed into a space between the feed roller 12 and the sheet-separation rubber member 10, friction force generated between the sheet-separation rubber member 10 and the sheets 11 prevents simultaneous feed (double feed) of a sheet 11 which is in contact with the rubber member 10 and not in contact with the roller 12 and a sheet 11 which is in contact with the roller 12. Subsequently, when the entirety of the sheet 11 comes into contact with the roller 12, the sheet 11 is further conveyed through rotation of the feed roller 12.

However, as mentioned above, when the sheet-separation rubber member 10 is formed of conventional polyurethane rubber, anomalous noise is generated during sliding with a sheet 11.

SUMMARY OF THE INVENTION

In view of the foregoing, the present inventors have carried out extensive studies in order to solve the aforementioned problems, and have found that forming an electrophotography rubber member by use of a polyurethane produced from a polyester-polyol having an ester concentration (as defined below) of 2–8 mmol/g—lower than that of a conventional polyester-polyol—reduces temperature dependence of rebound resilience; maintains a satisfactory level of rebound resilience within a low temperature range; and suppresses increase in rebound resilience within a high temperature range, to thereby suppress damage such as chipping of an edge.

The inventors have also found that forming a sheet-separation rubber member by use of a polyurethane produced from a polyester-polyol having an ester concentration (as defined below) of 2–8 mmol/g—lower than that of a conventional polyester-polyol—reduces temperature dependence of the rebound resilience; maintains a satisfactory level of rebound resilience in a low temperature range; and suppresses increase in rebound resilience in a high temperature range, to thereby reduce noise. The present invention has been accomplished on the basis of these findings.

Thus, an object of the present invention is to provide an electrophotography rubber member which has a rebound resilience that remains satisfactorily constant with respect to change in environmental conditions and can serve as a member such as a high-performance cleaning blade. Another object of the present invention is to provide a sheet-separation rubber member which can prevent double feed of paper sheets, sheet jam, and noise and which maintains friction characteristics and exhibits excellent wear resistance.

Accordingly, in a first aspect of the present invention, there is provided an electrophotography rubber member, which is formed of a rubber elastomer comprising a polyurethane formed from a long-chain polyol containing a polyester-polyol having a number average molecular weight of 500–5,000 and an ester concentration of 2–8 mmol/g, wherein the ester concentration is defined by the following relationship:

ester concentration ($mmol/g$)=(amount by $mol$ of ester groups)/ (weight of the polyester-polyol).

In a second aspect of the invention, there is provided a sheet-separation rubber member for use in a paper-feed part of an apparatus for office automation, which member is formed of a rubber elastomer comprising a polyurethane formed from a long-chain polyol containing a polyester-polyol having a number average molecular weight of 500–5,000 and an ester concentration of 2–8 mmol/g, wherein the ester concentration is defined by the following relationship:

ester concentration (mmol/g)=(amount by mol of ester groups)/(weight of the polyester-polyol).

Preferably in the first and second aspects of the invention, the difference between the rebound resilience of the rubber elastomer at 50° C. ($Rb_{T50}$) and that of the rubber elastomer at 10° C. ($Rb_{T10}$) is 55% or less, the difference being obtained by the following formula:

$$\Delta Rb(\%) = Rb_{T50} - Rb_{T10}.$$

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with accompanying drawings, in which.

DETAILED DESCRIPTION OF PREFERRED EMBODIMENTS

Figure 1:
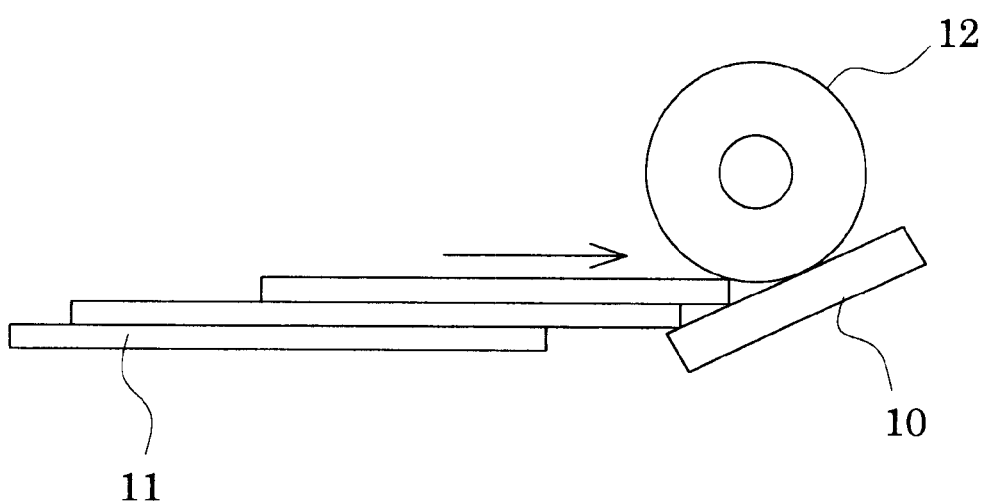
FIG. 1 shows an example sheet-feeding part.

The sheet-separation rubber member of the present invention formed of a polyurethane produced from a polyester-polyol having an ester concentration of 2–8 mmol/g remarkably reduces noise. Although the reason has not yet been elucidated in detail, noise reduction is considered to be achieved by use of a rubber elastomer exhibiting low temperature dependence of rebound resilience. In addition, the polyurethane employed as the rubber elastomer exhibits a minimum rebound resilience value at 0° C. or lower, when rebound resilience measured within a range of −20° C. to 60° C.

Among the polyurethanes which can be employed in the present invention, a polyurethane having an ester concentration of 6–8 mmol/g is particularly preferred, in that both mechanical strength and temperature dependence of properties such as rebound resilience can be satisfied.

The polyester-polyol having such an ester concentration is preferably produced through dehydration condensation of a diol and a dibasic acid, rather than being produced from a caprolactone-derived diol, which has conventionally been employed as a typical source. However, the aforementioned favorable characteristics can also be attained by use of an additional polyester-polyol other than polyester-polyols produced through dehydration condensation of a diol and a dibasic acid may also be used, so long as the ester concentration falls within the aforementioned range.

Examples of the polyester-polyol employed in the present invention include polyester-polyols which have the aforementioned ester concentration and are produced from a diol such as ethylene glycol, butanediol, hexanediol, nonanediol, decanediol, 3-methyl-1,5-pentanediol, neopentyl glycol, 2,4-diethyl-1,5-pentanediol, butylethylpropanediol, 1,9-nonanediol, or 2-methyl-1,8-octanediol; and a dibasic acid such as adipic acid, azelaic acid, sebacic acid, dimer acid, or hydrogenated dimer acid. Specific examples include nonanediol adipate, 2-methyl-1,8-octanediol adipate, decanediol adipate, hexanediol azelate, nonanediol azelate, 2-methyl-1,8-octanediol azelate, decanediol azelate, butanediol sebacate, hexanediol sebacate, nonanediol sebacate, 2-methyl-1,8-octanediol sebacate, decanediol sebacate, glycol esters of dimer acid, and glycol esters of hydrogenated dimer acid. The aforementioned diols or dibasic acids may be employed in combination.

In addition, lactones such as ε-caprolactone and δ-valerolactone may further be poly-added or copolymerized, so long as the ester concentration of the formed polyester-polyol falls within the range of the present invention. Specifically, a lactone is copolymerized during dehydration-condensation of a diol and a dibasic acid, to thereby form a random copolymer diol, or a lactone is added to a dehydration-condensation product of a diol and a dibasic acid, to thereby form a polyol. The thus-obtained polyols may also be used in the present invention. By use of such lactones, the rebound resilience, at low temperature, of polyurethanes produced from the polyols can be further enhanced.

Among these polyester-polyols, those produced through dehydration-condensation of a diol such as 1,9-nonanediol or methyl-1,8-octanediol and adipic acid are particularly preferred, from the viewpoints of product performance and costs. Needless to say, these components may be partially substituted with other glycols or dibasic acids. The compound "methyl-1,8-octanediol" herein refers to an octanediol having a methyl group other than at the 1-or 8-position of the diol. The position of methyl substitution is not limited, and typical examples include 2-methyl-1,8-octanediol.

Examples of the polyisocyanate which is caused to react with the polyester-polyol include 2,6-toluenediisocyanate (TDI), 4,4'-diphenylmethanediisocyanate (MDI), p-phenylenediisocyanate (PPDI), 1,5-naphthalenediisocyanate (NDI), and 3,3-dimethyldiphenyl-4,4'-diisocyanate (TODI). Of these, MDI is particularly preferred, from the viewpoints of product performance and costs.

In order to produce polyurethane from the aforementioned polyester-polyol, a polyisocyanate is mixed into a mixture of the polyester-polyol and a short-chain polyol serving as a chain-extender, and the resultant mixture is caused to react. Techniques typically employed for producing polyurethane, such as a pre-polymer method and a one-shot method, may be employed. No particular limitation is imposed on the technique, and the pre-polymer method is preferred in the present invention, since polyurethane having excellent mechanical strength and wear resistance can be produced.

The short-chain polyol has a number average molecular weight of 500 or less, examples of which include C2-C12 linear-main-chain glycol such as ethylene glycol, 1,3-propanediol, and 1,4-butanediol; C≦12 diols having a side chain such as neopentyl glycol and 3-methyl-1,5-pentanediol; C≦12 diols having an unsaturated group such as 3-allyloxy-1,2-propanediol; C≦20 diols having an aromatic ring such as 1,4-bis(hydroxyethoxy)benzene and p-xylene glycol; alicyclic diols such as cyclohexanediol and cyclohexanedimethanol; triols such as trimethylolethane, trimethylolpropane, and glycerin; and polyol having 4 or more hydroxyl groups such as pentaerythritol and sorbitol. Needless to say, these short-chain polyols may be used in combination of two or more species.

Of these, 1,4-butanediol and 1,3-propanediol are particularly preferred, from the viewpoints of production performance and costs. Particularly, 1,3-propanediol imparts excellent effects to the produced polyurethane when used in combination with a polyol having an ester concentration of 6–8 mmol/g. In order to improve mechanical properties; e.g., creep and stress relaxation characteristics of polyurethane, trimethylolethane—a polyol having 3 or more hydroxyl groups—is preferably used in combination.

The polyurethane which is used in the present invention preferably has a long-chain polyol content of 60–80 wt. %.

In the present invention, in addition to the aforementioned polyester-polyol, another long-chain polyol may be used in combination. However, the ratio by weight of the aforementioned polyester-polyol to all long-chain polyols is preferably 90–30 wt. %. In addition, the rubber elastomer of the present invention may have a rubber hardness, as measured in accordance with JIS A, of 50–90°.

Figure 2:
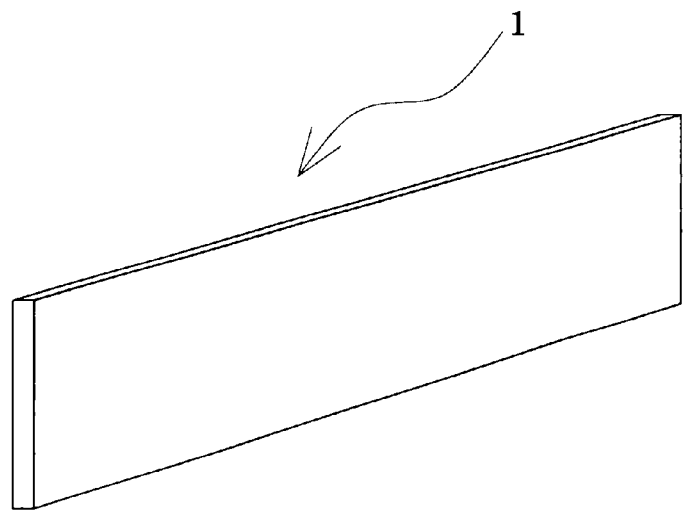
FIG. 2 shows an example electrophotography rubber member.

When an electrophotography rubber member is formed of the aforementioned specific polyurethane, temperature dependence of rebound resilience is remarkably reduced while the mechanical properties required for such a rubber member are maintained. Particularly, the polyurethane is preferably used to form an electrophotography rubber member such as a cleaning blade 1 shown in FIG. 2.

Thus, the present invention provides an electrophotography rubber member which has a rebound resilience remaining satisfactorily stabilized over changes in environmental conditions and which can serve as a member such as a high-performance cleaning blade.

Figure 3:
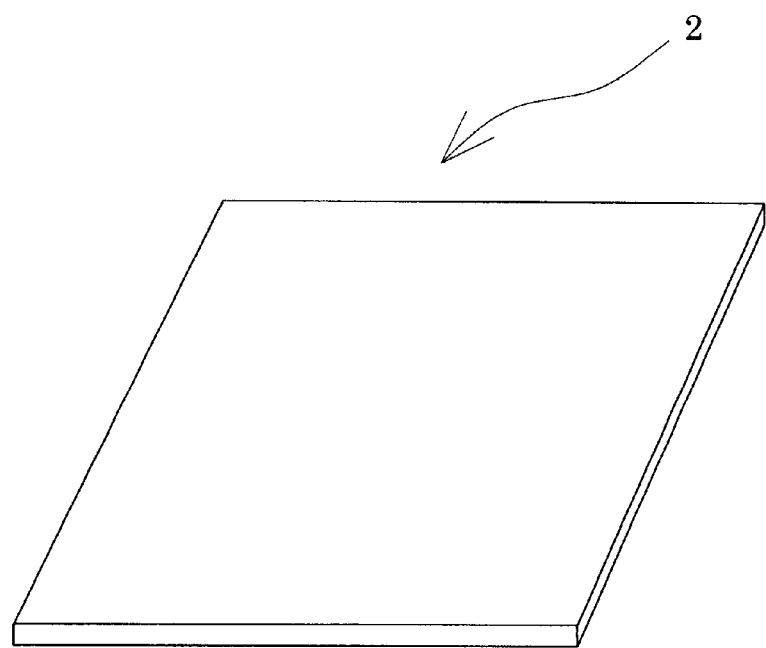
FIG. 3 shows an example sheet-separation rubber member.

Similarly, when a sheet-separation rubber member is formed of the aforementioned specific polyurethane, noise generation is remarkably reduced. Such sheet-separation rubber members include a separation pad 2 shown in FIG. 3.

Thus, the present invention provides a sheet-separation rubber member which has a rebound resilience remaining satisfactorily stabilized over changes in environmental conditions and which generates no noise.

EXAMPLES

The present invention will next be described in detail by way of examples.

Example 1

A polyester-polyol having a molecular weight of 2,000 was prepared from 1,9-nonanediol and adipic acid. The thus-prepared polyester-polyol had an ester concentration of 6.8 mmol/g.

This polyester-polyol, MDI, and a 1,4-butanediol/trimethylolpropane mixture liquid serving as a chain-extender were caused to react, to thereby form a heat-cured polyurethane having a polyester-polyol content of approximately 65 wt. %. From the polyurethane, test specimens and cleaning blades were prepared.

Example 2

A polyester-polyol having a molecular weight of 2,000 was prepared from hexanediol and hydrogenated dimer acid. The thus-prepared polyester-polyol had an ester concentration of 3.0 mmol/g.

The procedure of Example 1 was repeated, except that this polyester-polyol was used instead of the polyester-polyol produced in Example 1, to thereby form a polyurethane having a polyester-polyol content of approximately 65 wt. %. From the polyurethane, test specimens and cleaning blades were prepared.

Example 3

A polyester-polyol having a molecular weight of 2,000 was prepared from 1,9-nonanediol/2-methyl-1,8-octanediol (mol ratio 65/35) and adipic acid. The thus-prepared polyester-polyol had an ester concentration of 6.8 mmol/g.

This polyester-polyol, MDI, and a 1,3-propanediol/trimethylolethane mixture liquid serving as a chain-extender were caused to react, to thereby form a heat-cured polyurethane having a polyester-polyol content of approximately 65 wt. %. From the polyurethane, test specimens and cleaning blades were prepared.

Example 4

The procedure of Example 3 was repeated, except that $\epsilon$-caprolactone was further copolymerized at 25 wt. %, to thereby yield a polyester-polyol having a molecular weight of 2,000 and an ester concentration of 7.3 mmol/g.

This polyester-polyol, MDI, and a 1,3-propanediol/trimethylolethane mixture liquid serving as a chain-extender were caused to react, to thereby form a heat-cured polyurethane having a polyester-polyol content of approximately 65 wt. %. From the polyurethane, test specimens and cleaning blades were prepared.

Comparative Example 1

The procedure of Example 1 was repeated, except that a polyester-polyol formed from ethylene glycol and adipic acid and having a molecular weight of 2,000 (ester concentration of 11.3 mmol/g) was used instead of the polyester-polyol produced in Example 1, to thereby form a polyurethane having a polyester-polyol content of approximately 65 wt. %. From the polyurethane, test specimens and cleaning blades were prepared.

Comparative Example 2

The procedure of Example 1 was repeated, except that a polyester-diol formed by adding $\epsilon$-caprolactone to ethylene glycol and having a number average molecular weight of 2,000 (caprolactone A: ester concentration of 8.5 mmol/g) was used, to thereby form a polyurethane having a polyester-polyol content of approximately 65 wt. %. From the polyurethane, test specimens and cleaning blades were prepared.

Comparative Example 3

The procedure of Example 1 was repeated, except that a polyester-diol formed by adding $\epsilon$-caprolactone to dodecanediol and having a number average molecular weight of 1,500 (caprolactone B: ester concentration of 7.6 mmol/g) was used, to thereby form a polyurethane having a polyester-polyol content of approximately 65 wt. %. From the polyurethane, test specimens and cleaning blades were prepared.

Test Example 1

Figure 4:
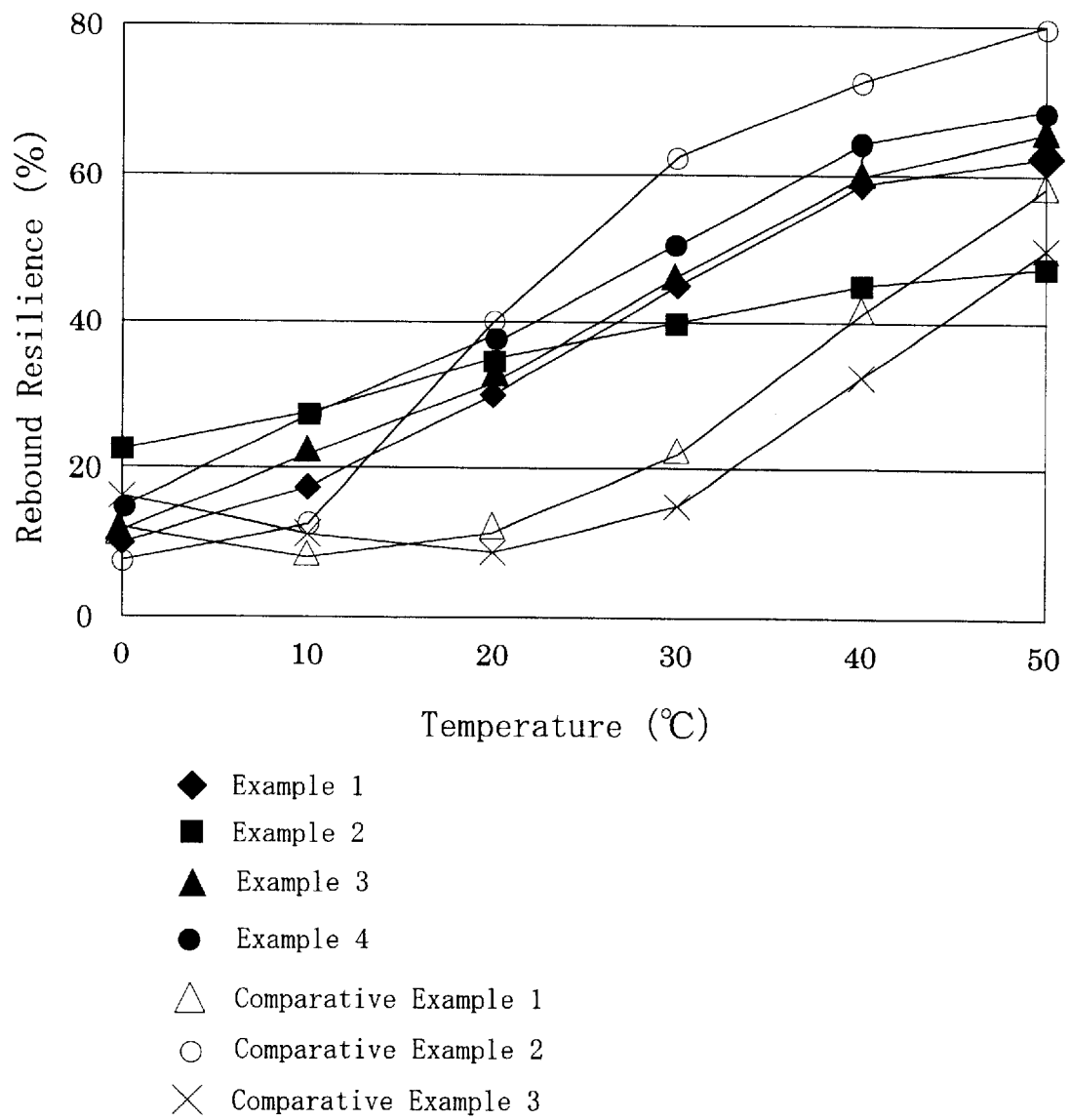
FIG. 4 is a graph showing the results of Test Example 1.

Each of the test specimens of the Examples and the Comparative Examples was measured in terms of rebound resilience at 0° C. to 50° C., and the temperature dependence of the rebound resilience was evaluated. The rebound resilience of the test specimens was measured by use of Luepke's resilience tester in accordance with JIS K6255. The rubber hardness of the specimens was measured in accordance with JIS K6253. Table 1 and FIG. 4 show the results.

TABLE 1

|  | Ex. 1 | Ex. 2 | Ex. 3 | Ex. 4 | Comp. Ex. 1 | Comp. Ex. 2 | Comp. Ex. 3 |
|---|---|---|---|---|---|---|---|
| Polyester composition (diol/di-acid) | ND/AA | HD/DA | ND/MOD/AA | ND/MOD/CL/AA | EG/AA | CLA | CLB |
| Mol. wt. | 2,000 | 2,000 | 2,000 | 2,000 | 2,000 | 2,000 | 1,500 |
| Ester concentration in PE-PO (mmol/g) | 6.8 | 3.0 | 6.8 | 7.3 | 11.3 | 8.5 | 7.6 |
| Rb (%)　　0° C. | 8 | 21 | 12 | 15 | 12 | 10 | 17 |
| [Temp.　　10° C. | 17 | 27 | 22 | 27 | 9 | 15 | 14 |
| dependence]　20° C. | 31 | 34 | 33 | 38 | 12 | 40 | 9 |
| 　　　　　　30° C. | 45 | 40 | 47 | 51 | 22 | 61 | 15 |
| 　　　　　　40° C. | 58 | 45 | 60 | 64 | 41 | 74 | 34 |
| 　　　　　　50° C. | 66 | 48 | 67 | 69 | 59 | 79 | 52 |
| Rb minimum at (° C.) | −10 | −15 | −12 | −14 | 10 | −5 | 20 |
| Hardness (JIS A) | 76 | 65 | 75 | 74 | 74 | 72 | 75 |

Note:
ND; nonanediol, HD; hexanediol, MOD; methyloctanediol, EG; ethylene glycol, CL; caprolactone, CLA; caprolactone A, CLB; caprolactone B  AA; adipic acid, DA; hydrogenated dimer acid, PE-PO; polyester-polyol The above measurement results show that the test specimens of Examples 1 to 4 exhibit a remarkably lower temperature dependence of rebound resilience than do the test specimens of Comparative Examples 1 to 3; a ΔRb of 55% or less; and a rebound resilience at 10° C. of at least 15% and that at 50° C. of 70% or less.

Test Example 2

Each of the cleaning blades produced in the Examples and the Comparative Examples was evaluated in terms of cleaning performance under the following conditions: LL (10° C., 15% RH), NN (23° C., 50% RH), and HH (35° C., 85% RH), and wear of the edge for each cleaning was observed. The cleaning performance was tested by use of spherically polymerized toner (average particle size of 6 μm). Table 2 shows the results together with the data of rebound resilience as measured.

TABLE 2

|  | $Rb_{T10}$ | $Rb_{T50}$ | ΔRb | Cleaning performance | | | Wear of edge |
|---|---|---|---|---|---|---|---|
|  |  |  |  | LL | NN | HH |  |
| Ex. 1 | 17 | 66 | 49 | O | O | O | OK |
| Ex. 2 | 27 | 48 | 21 | O | O | O | OK |
| Ex. 3 | 22 | 67 | 45 | O | O | O | OK |
| Ex. 4 | 27 | 69 | 42 | O | O | O | OK |
| Comp. Ex. 1 | 9 | 59 | 50 | X | O | O | OK |
| Comp. Ex. 2 | 15 | 79 | 64 | O | O | X | NG |
| Comp. Ex. 3 | 14 | 52 | 38 | X | X | O | NG |

In Table 2, rating "O" represents excellent cleaning performance, and "X" represents incomplete cleaning performance. Regarding wear of the edge, rating "OK" represents uniform wear which causes no image failure, and rating "NG" represents chip-like wear which causes image failure.

The results show that the cleaning blades of Examples 1 to 4 exhibit cleaning performance with less variance with respect to change in temperature; excellent cleaning performance at low temperature; and excellent durability of edges during use at high temperature. In addition, these cleaning blades had a ΔRb of 55% or less; and a rebound resilience at 10° C. of at least 15% and that at 50° C. of 70% or less.

In contrast, the cleaning blade of Comparative Example 1—produced from a polyester-polyol having a high ester concentration—exhibits poor cleaning performance at low temperature, although the blade exhibits uniform wear at the edge. The cleaning blade exhibits a rebound resilience less than 15% at 10° C., although the blade exhibits a ΔRb of 55% or less.

The cleaning blade of Comparative Example 2 exhibits no cleaning performance at high temperature. The cleaning blade exhibits a ΔRb of 64%, indicating great temperature dependence of rebound resilience, and a rebound resilience higher than 70% at 50° C.

The cleaning blade of Comparative Example 3, which is formed of a polyurethane produced from a polyester-polyol having an ester concentration less than 8 mmol/g, fails to provide excellent cleaning performance. Although the cleaning blade exhibits a ΔRb of 38%, indicating comparatively low temperature dependence of rebound resilience, and a rebound resilience less than 70% at 50° C., the rebound resilience reaches its minimum value at 20° C., which is higher than 0° C.

The above results indicate that cleaning blades formed of a conventional polyester-urethane produced from poly(ethylene adipate) or polycaprolactone exhibit poor cleaning performance for toner of small particle size and low deviation from spherical form, even though these cleaning blades exhibit excellent cleaning performance for conventional toner formed of crushed particles of comparatively large particle size. The results also indicate that the rubber member (i.e., cleaning blade) formed of a polyurethane satisfying the conditions according to the present invention attains superior cleaning performance for toner of small particle size and low deviation from spherical form.

Example 5

A polyester-polyol having a molecular weight of 2,000 was prepared from 1,9-nonanediol and adipic acid. The thus-prepared polyester-polyol had an ester concentration of 6.8 mmol/g.

This polyester-polyol, MDI, and a 1,3-propanediol/trimethylolethane mixture liquid serving as a chain-extender were caused to react, to thereby form a heat-cured polyurethane having a polyester-polyol content of approximately 65 wt. %. From the polyurethane, test specimens and sheet-separation rubber members were prepared.

Example 6

A polyester-polyol having a molecular weight of 2,000 was prepared from hexanediol and hydrogenated dimer acid. The thus-prepared polyester-polyol had an ester concentration of 3.0 mmol/g.

This polyester-polyol, MDI, and a 1,4-butanediol/trimethylolpropane mixture liquid serving as a chain-extender were caused to react, to thereby form a heat-cured polyurethane having a polyester-polyol content of approximately 65 wt. %. From the polyurethane, test specimens and sheet-separation rubber members were prepared.

Comparative Example 4

The procedure of Example 6 was repeated, except that a polyester-polyol formed from ethylene glycol and adipic acid and having a molecular weight of 2,000 (ester concentration of 11.3 mmol/g) was used instead of the polyester-polyol produced in Example 6, to thereby form a polyurethane having a polyester-polyol content of approximately 65 wt. %. From the polyurethane, test specimens and sheet-separation rubber members were prepared.

Comparative Example 5

The procedure of Example 6 was repeated, except that a polyester-diol formed by adding ε-caprolactone to ethylene glycol and having a number average molecular weight of 2,000 (caprolactone A: ester concentration of 8.5 mmol/g) was used, to thereby form a polyurethane having a polyester-polyol content of approximately 65 wt. %. From the polyurethane, test specimens and sheet-separation rubber members were prepared.

Comparative Example 6

The procedure of Example 6 was repeated, except that a polyester-diol formed by adding ε-caprolactone to dodecanediol and having a number average molecular weight of 1,500 (caprolactone B: ester concentration of 7.6 mmol/g) was used, to thereby form a polyurethane having a polyester-polyol content of approximately 65 wt. %. From the polyurethane, test specimens and sheet-separation rubber members were prepared.

Test Example 3

Figure 5:
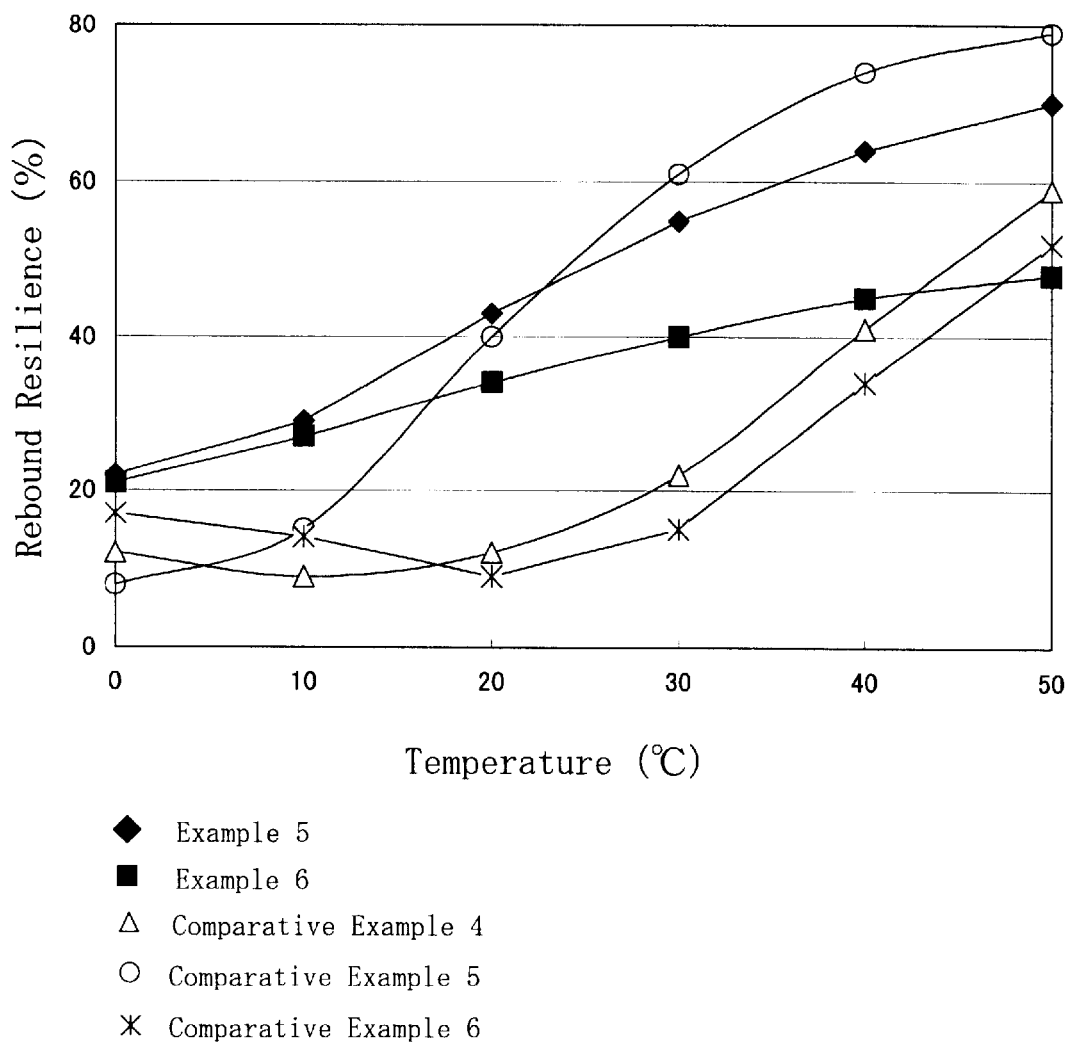
FIG. 5 is a graph showing the results of Test Example 3.

Each of test specimens of Examples 5 and 6 and Comparative Examples 4 to 6 was measured in terms of rebound resilience at 0° C. to 50° C., and the temperature dependence of the rebound resilience was evaluated. The rebound resilience of the test specimens was measured by use of Luepke's resilience tester in accordance with JIS K6255. The rubber hardness of the specimens was measured in accordance with JIS K6253. Table 3 and FIG. 5 show the results.

TABLE 3

|  |  | Ex. 5 | Ex. 6 | Comp. Ex. 4 | Comp. Ex. 5 | Comp. Ex. 6 |
| --- | --- | --- | --- | --- | --- | --- |
| Polyester composition (diol/di-acid) |  | ND/AA | HD/DA | EG/AA | CLA | CLB |
| Mol. wt. |  | 2,000 | 2,000 | 2,000 | 2,000 | 1,500 |
| Ester concentration in PE-PO (mmol/g) |  | 6.8 | 3.0 | 11.3 | 8.5 | 7.6 |
| Rb (%) | 0° C. | 22 | 21 | 12 | 10 | 17 |
| [Temp. dependence] | 10° C. | 29 | 27 | 9 | 15 | 14 |
|  | 20° C. | 43 | 34 | 12 | 40 | 9 |
|  | 30° C. | 55 | 40 | 22 | 61 | 15 |
|  | 40° C. | 64 | 45 | 41 | 74 | 34 |
|  | 50° C. | 70 | 48 | 59 | 79 | 52 |
| Rb minimum at (° C.) |  | −10 | −15 | 10 | −5 | 20 |
| Hardness (JIS A) |  | 76 | 65 | 74 | 72 | 75 |

Note:
ND; nonanediol, HD; hexanediol, EG; ethylene glycol, CLA; caprolactone A, CLB; caprolactone B  AA; adipic acid, DA; hydrogenated dimer acid, PE-PO; polyester-polyol The above measurement results show that the test specimens of Examples 5 and 6 exhibit a remarkably lower temperature dependence of rebound resilience than do the test specimens of Comparative Example 4 to 6; a ΔRb of 55% or less; and a rebound resilience at 10° C. of at least 15% and that at 50° C. of 70% or less.

Test Example 4

By use of each of sheet-separation rubber members of Examples 5 and 6 and Comparative Examples 4 to 6, a sheet feed test was performed under LL (10° C., 15% RH) conditions. After passage of sheets (10 K) had been complete, failure of feed, wear of the rubber member, and noise generation were checked. Table 4 shows the results together with the data of rebound resilience as measured.

TABLE 4

| | Hardness | Rb | | | Feed | Wear resis- | |
| --- | --- | --- | --- | --- | --- | --- | --- |
| | JIS A | 10° C. | 50° C. | ΔRb | failure* | tance | Noise |
| Ex. 5 | 75 | 29 | 70 | 41 | None | O | No |
| Ex. 6 | 76 | 27 | 48 | 21 | None | O | No |
| Comp. Ex. 4 | 74 | 9 | 59 | 50 | D/F 6 times | X | Yes |
| Comp. Ex. 5 | 72 | 15 | 79 | 64 | None | X | Yes |
| Comp. Ex. 6 | 75 | 14 | 52 | 38 | D/F 14 times | X | Yes |

Note:
*; Under LL conditions, after passage of sheets (10K), D/F; double feed, O; excellent, X; poor The results show that the sheet-separation rubber member of Examples 5 and 6 exhibit constant feeding performance; excellent wear resistance; and no noise. In addition, these sheet-separation rubber members have a ΔRb of 55% or less; and a rebound resilience at 10° C. of at least 15% and that at 50° C. of 70% or less.

In contrast, the sheet-separation rubber member of Comparative Example 4—produced from a polyester-polyol having a high ester concentration—caused double feeding (D/F) six times; exhibit unsatisfactory wear resistance; and generate noise. The sheet-separation rubber member exhibits a rebound resilience less than 15% at 10° C., although the rubber member exhibits a ΔRb of 55% or less.

The sheet-separation rubber member of Comparative Example 5 generates noise, although the rubber member performs feeding without failure. The rubber member exhibits a ΔRb of 64%, indicating great temperature dependence of rebound resilience, and a rebound resilience higher than 70% at 50° C.

The sheet-separation rubber member of Comparative Example 6, which was formed of a polyurethane produced from a polyester-polyol having an ester concentration less than 8 mmol/g, caused double feeding (D/F) 14 times; exhibits unsatisfactory wear resistance; and generates noise. Although the rubber member exhibits a ΔRb of 38%, indicating comparatively low temperature dependence of rebound resilience, and the rebound resilience is less than 70% at 50° C., the rebound resilience reaches the minimum value at 20° C., which is higher than 0° C.

Example 5

The sheet-separation rubber members of Example 5 and Comparative Example 5 were investigated in terms of rubber hardness, rebound resilience, Young's modulus, tensile strength at 100% elongation (referred to as 100% Modulus), tensile strength at 300% elongation (referred to as 300% Modulus), tensile strength, elongation, tear strength, and 100% tension set, and the results are shown in Table 5.

TABLE 5

|  |  | Ex. 5 | Comp. Ex. 5 |
|---|---|---|---|
| Hardness | ° (JIS A) | 76 | 72 |
| Rebound resilience (25° C.) | % | 50 | 51 |
| Young's modulus | kg/cm$^2$ | 87 | 87 |
| 100% Modulus | kg/cm$^2$ | 58 | 41 |
| 300% Modulus | kg/cm$^2$ | 220 | 150 |
| Tensile strength | kg/cm$^2$ | 400 | 340 |
| Elongation | % | 360 | 330 |
| Tear strength | kg/cm | 90 | 70 |
| 100% Tension set | % | 1.40 | 2.20 |

As is clear from Table 5, the rubber member of Example 5 has excellent mechanical properties as compared with the rubber member of Comparative Example 5. In addition to reduced ΔRb of the rubber member of Example 5 as shown in Table 4 representing lowered environment dependence and leading to reduce noise, the excellent properties shown in Table 5 also contribute to reduction in noise of the rubber member of Example 5 and enhancement of wear resistance thereof.

What is claimed is:

1. An electrophotography rubber member, which is formed of a rubber elastomer comprising a polyurethane formed from a long-chain polyol containing a polyester-polyol having a number average molecular weight of 500–5,000 a polyisocyanate, and a short-chain polyol having a molecular weight less than 500, wherein the polyester-polyol has an ester concentration of 2–8 mmol/g, wherein the ester concentration is defined by the following relationship:

ester concentration ($mmol/g$)=(amount by $mol$ of ester groups)/ (weight of the polyester-polyol), and wherein the polyurethane contains the long-chain polyol in an amount of 60–80 wt. % and the short-chain polyol comprises a polyol having three or more hydroxyl groups and at least one of 1,4-butanediol and 1,3-propanediol.

2. An electrophotography rubber member according to claim 1, wherein the polyester-polyol is obtained through dehydration-condensation of a diol component and a dibasic acid.

3. An electrophotography rubber member according to claim 1, wherein the polyester-polyol is obtained through dehydration-condensation of a diol component and a dibasic acid concomitant with copolymerization of a lactone or through poly-addition of a lactone to a dehydration-condensation product of a diol component and a dibasic acid.

4. An electrophotography rubber member according to claim 1, wherein the rubber elastomer exhibits a minimum rebound resilience value at 0° C. or lower, when rebound resilience is measured in a range of −20° C. to 60° C.

5. An electrophotography rubber member according to claim 1, wherein the difference between the rebound resilience of the rubber elastomer at 50° C., represented by RbT50, and that of the rubber elastomer at 10° C., represented by RbT10, is 55% or less, the difference being obtained by the following formula:

Δ$Rb$(%)=$RbT$50−$RbT$10.

6. An electrophotography rubber member according to claim 1, wherein the rubber elastomer exhibits a rebound resilience of at least 15% at 10° C. and a rebound resilience of 70% or less at 50° C.

7. An electrophotography rubber member according to claim 1, wherein the rubber elastomer has a rubber hardness, as measured in accordance with JIS A, of 50–90°.

8. An electrophotography rubber member according to claim 1, wherein the polyurethane is obtained from a polyester-polyol having an ester concentration as defined by the relationship described above of 6–8 mmol/g.

9. An electrophotography rubber member according to claim 1, wherein the long-chain polyester polyol predominantly comprises a polyester-polyol which is obtained through condensation of adipic acid and at least one of 1,9-nonanediol and methyl-1,8-octanediol.

10. An electrophotography rubber member according to claim 1, wherein the polyisocyanate predominantly comprises diphenylmethane diisocyanate.

11. An electrophotography rubber member according to claim 1, wherein the short-chain polyol predominantly comprises 1,3-propanediol.

12. An electrophotography rubber member according to claim 1, which is blade-shaped.

13. A sheet-separation rubber member for use in a paper-feed part of an apparatus for office automation, which member is formed of a rubber elastomer comprising a polyurethane formed from a long-chain polyol containing a polyester-polyol having a number average molecular weight of 500–5,000, a polyisocyanate, and a short-chain polyol having a molecular weight less than 500, wherein the polyester-polyol has an ester concentration of 2–8 mmol/g, wherein the ester concentration is defined by the following relationship:

ester concentration ($mmol/g$)=(amount by $mol$ of ester groups)/ (weight of the polyester-polyol), and wherein the polyurethane contains the long-chain polyol in an amount of 60–80 wt. % and the short-chain polyol comprises a polyol having three or more hydroxyl groups and at least one of 1,4-butanediol and 1,3-propanediol.

14. A sheet-separation rubber member according to claim 13, wherein the difference between the rebound resilience of the rubber elastomer at 50° C., represented by RbT50 and that of the rubber elastomer at 10° C., represented by RbT10, is 55% or less, the difference being obtained by the following formula:

Δ$Rb$(%)=$RbT$50−$RbT$10.

15. A sheet-separation rubber member according to claim 13, wherein the rubber elastomer exhibits a minimum rebound resilience value at 0° C. or lower, when rebound resilience is measured in a range of −20° C. to 60° C.

16. A sheet-separation rubber member according to claim 13, wherein the rubber elastomer exhibits a rebound resilience of at least 15% at 10° C. and a rebound resilience of 70% or less at 50° C.

17. A sheet-separation rubber member according to claim 13, wherein the rubber elastomer has a rubber hardness, as measured in accordance with JIS A, of 50–90°.

18. A sheet-separation rubber member according to claim 16, wherein the polyurethane is obtained from a polyester-polyol having an ester concentration as defined by the relationship described above of 6–8 mmol/g.

19. A sheet-separation rubber member according to claim 13, wherein the long-chain polyester polyol predominantly comprises a polyester-polyol which is obtained through condensation of adipic acid and at least one of 1,9-nonanediol and methyl-1,8-octanediol.

20. A sheet-separation rubber member according to claim 13, wherein the polyisocyanate predominantly comprises diphenylmethane diisocyanate.

21. A sheet-separation rubber member according to claim 13, wherein the short-chain polyol predominantly comprises trimethylolethane and 1,3-propanediol.

* * * * *